United States Patent
Traut et al.

(10) Patent No.: US 9,053,038 B2
(45) Date of Patent: Jun. 9, 2015

(54) METHOD AND APPARATUS FOR EFFICIENT READ CACHE OPERATION

(71) Applicants: Zachary David Traut, Denver, CO (US); Michael David Barrell, Superior, CO (US)

(72) Inventors: Zachary David Traut, Denver, CO (US); Michael David Barrell, Superior, CO (US)

(73) Assignee: Dot Hill Systems Corporation, Longmont, CO (US)

( * ) Notice: Subject to any disclaimer, the term of this patent is extended or adjusted under 35 U.S.C. 154(b) by 213 days.

(21) Appl. No.: 13/952,749

(22) Filed: Jul. 29, 2013

(65) Prior Publication Data

US 2014/0258638 A1 Sep. 11, 2014

Related U.S. Application Data

(60) Provisional application No. 61/772,691, filed on Mar. 5, 2013.

(51) Int. Cl.
*G06F 12/08* (2006.01)

(52) U.S. Cl.
CPC ........ *G06F 12/0891* (2013.01); *G06F 12/0866* (2013.01); *G06F 12/0862* (2013.01)

(58) Field of Classification Search
CPC .......................... G06F 12/0862; G06F 12/0866
USPC .................................................. 711/113, 137
See application file for complete search history.

(56) References Cited

U.S. PATENT DOCUMENTS

| | | |
|---|---|---|
| 5,381,528 A | 1/1995 | Brunelle |
| 5,410,653 A | 4/1995 | Macon, Jr. et al. |
| 5,522,054 A | 5/1996 | Gunlock et al. |
| 5,557,767 A | 9/1996 | Sukegawa |
| 5,600,817 A | 2/1997 | Macon, Jr. et al. |
| 5,619,723 A | 4/1997 | Jones et al. |
| 5,640,530 A | 6/1997 | Beardsley et al. |
| 5,680,573 A | 10/1997 | Rubin et al. |
| 5,687,389 A | 11/1997 | Packer |
| 5,809,560 A | 9/1998 | Schneider |
| 6,047,359 A | 4/2000 | Fouts |
| 6,070,230 A | 5/2000 | Capps |
| 6,092,141 A | 7/2000 | Lange |
| 6,092,149 A | 7/2000 | Hicken et al. |
| 6,108,764 A | 8/2000 | Baumgartner et al. |
| 6,195,727 B1 | 2/2001 | Islam et al. |
| 6,226,713 B1 | 5/2001 | Mehotra |

(Continued)

OTHER PUBLICATIONS

Notice of Allowance dated Oct. 7, 2014 for U.S. Appl. No. 13/482,314.

(Continued)

*Primary Examiner* — Than Nguyen
(74) *Attorney, Agent, or Firm* — Thomas J. Lavan

(57) ABSTRACT

A method for providing efficient use of a read cache by a storage controller is provided. The method includes the storage controller receiving a read request from a host computer and determining if a host stream size is larger than a read cache size. The host stream size is a current cumulative size of all read requests in the host stream. If the host stream size is larger than the read cache size then migrating data to a first area of the read cache containing data that has been in the read cache for the longest time. If the host stream size is not larger than the read cache size then migrating data to a second area of the read cache containing data that has been in the read cache for the shortest time. The host stream is a consecutive group of sequential read requests from the host computer.

20 Claims, 12 Drawing Sheets host stream analysis process

(56) References Cited

U.S. PATENT DOCUMENTS

| | | |
|---|---|---|
| 6,249,804 B1 | 6/2001 | Lam |
| 6,286,080 B1 | 9/2001 | Galbraith et al. |
| 6,321,300 B1 | 11/2001 | Ornes et al. |
| 6,338,115 B1 | 1/2002 | Galbraith et al. |
| 6,349,326 B1 | 2/2002 | Lam |
| 6,505,268 B1 | 1/2003 | Schultz et al. |
| 6,523,086 B1 | 2/2003 | Lee |
| 6,549,977 B1 | 4/2003 | Horst et al. |
| 6,567,892 B1 | 5/2003 | Horst et al. |
| 6,701,413 B2 | 3/2004 | Shirai et al. |
| 6,775,794 B1 | 8/2004 | Horst et al. |
| 6,785,771 B2 | 8/2004 | Ash et al. |
| 6,789,171 B2 | 9/2004 | Desai et al. |
| 6,842,792 B2 | 1/2005 | Johnson et al. |
| 6,877,065 B2 | 4/2005 | Galbraith et al. |
| 6,910,099 B1 | 6/2005 | Wang et al. |
| 6,915,404 B1 | 7/2005 | Desai et al. |
| 6,931,486 B2 | 8/2005 | Cavallo et al. |
| 6,965,966 B1 | 11/2005 | Rothberg et al. |
| 7,069,354 B2 | 6/2006 | Pooni et al. |
| 7,080,208 B2 | 7/2006 | Ashmore et al. |
| 7,120,753 B2 | 10/2006 | Accapadi et al. |
| 7,146,467 B2 | 12/2006 | Beardon et al. |
| 7,216,203 B1 | 5/2007 | Bagewadi |
| 7,260,679 B2 | 8/2007 | Benhase et al. |
| 7,302,530 B2 | 11/2007 | Barrick et al. |
| 7,318,142 B2 | 1/2008 | Accapadi et al. |
| 7,337,262 B2 | 2/2008 | Beeston et al. |
| 7,493,450 B2 | 2/2009 | Beardon |
| 7,523,259 B2 | 4/2009 | Pistoulet |
| 7,543,124 B1 | 6/2009 | Accapadi et al. |
| 7,627,714 B2 | 12/2009 | Ash et al. |
| 7,664,785 B2 | 2/2010 | Kano |
| 7,721,043 B2 | 5/2010 | Gill et al. |
| 7,724,568 B2 | 5/2010 | Arya et al. |
| 7,853,751 B2 | 12/2010 | Manoj |
| 7,996,623 B2 | 8/2011 | Walker |
| 8,074,020 B2 | 12/2011 | Seaman et al. |
| 8,255,627 B2 | 8/2012 | Blinick et al. |
| 8,356,126 B2 | 1/2013 | Ashmore |
| 8,478,945 B2 | 7/2013 | Ash et al. |
| 8,700,854 B2 | 4/2014 | Ash et al. |
| 8,788,742 B2 | 7/2014 | Benhase et al. |
| 8,788,755 B2 | 7/2014 | Satran et al. |
| 8,799,571 B1 | 8/2014 | DesRoches et al. |
| 8,806,122 B2 | 8/2014 | Benhase et al. |
| 2002/0069322 A1 | 6/2002 | Galbraith et al. |
| 2003/0041214 A1 | 2/2003 | Hirao et al. |
| 2003/0225977 A1 | 12/2003 | Desai et al. |
| 2004/0205298 A1* | 10/2004 | Bearden et al. ............... 711/137 |
| 2004/0205299 A1 | 10/2004 | Beardon |
| 2005/0021879 A1 | 1/2005 | Douglas |
| 2005/0060495 A1 | 3/2005 | Pistoulet |
| 2005/0071596 A1 | 3/2005 | Aschoff et al. |
| 2005/0235108 A1 | 10/2005 | Hiratsuka |
| 2005/0235125 A1 | 10/2005 | Accapadi et al. |
| 2006/0020759 A1 | 1/2006 | Barrick et al. |
| 2006/0069876 A1* | 3/2006 | Bansal et al. ................ 711/134 |
| 2006/0248278 A1 | 11/2006 | Beeston et al. |
| 2006/0248387 A1 | 11/2006 | Nicholson et al. |
| 2006/0288186 A1 | 12/2006 | Accapadi et al. |
| 2007/0005904 A1 | 1/2007 | Lemoal et al. |
| 2007/0239747 A1 | 10/2007 | Pepper |
| 2007/0276993 A1 | 11/2007 | Hiratsuka |
| 2008/0005481 A1 | 1/2008 | Walker |
| 2009/0219760 A1 | 9/2009 | Arya et al. |
| 2010/0169283 A1 | 7/2010 | Atluri et al. |
| 2010/0208385 A1 | 8/2010 | Toukairin |
| 2011/0145508 A1 | 6/2011 | Pelleg et al. |
| 2012/0047548 A1 | 2/2012 | Rowlands et al. |
| 2012/0144123 A1 | 6/2012 | Aronovich et al. |
| 2013/0326149 A1 | 12/2013 | Barrell |
| 2014/0181415 A1* | 6/2014 | Loh et al. .................... 711/137 |
| 2014/0250268 A1 | 9/2014 | Traut et al. |
| 2014/0351527 A1 | 11/2014 | Traut et al. |

OTHER PUBLICATIONS

Notice of Allowance dated Oct. 30, 2014 for U.S. Appl. No. 14/465,291.

Notice of Allowance dated Nov. 7, 2014 for U.S. Appl. No. 14/465,291.

* cited by examiner

Fig. 3 Data storage system
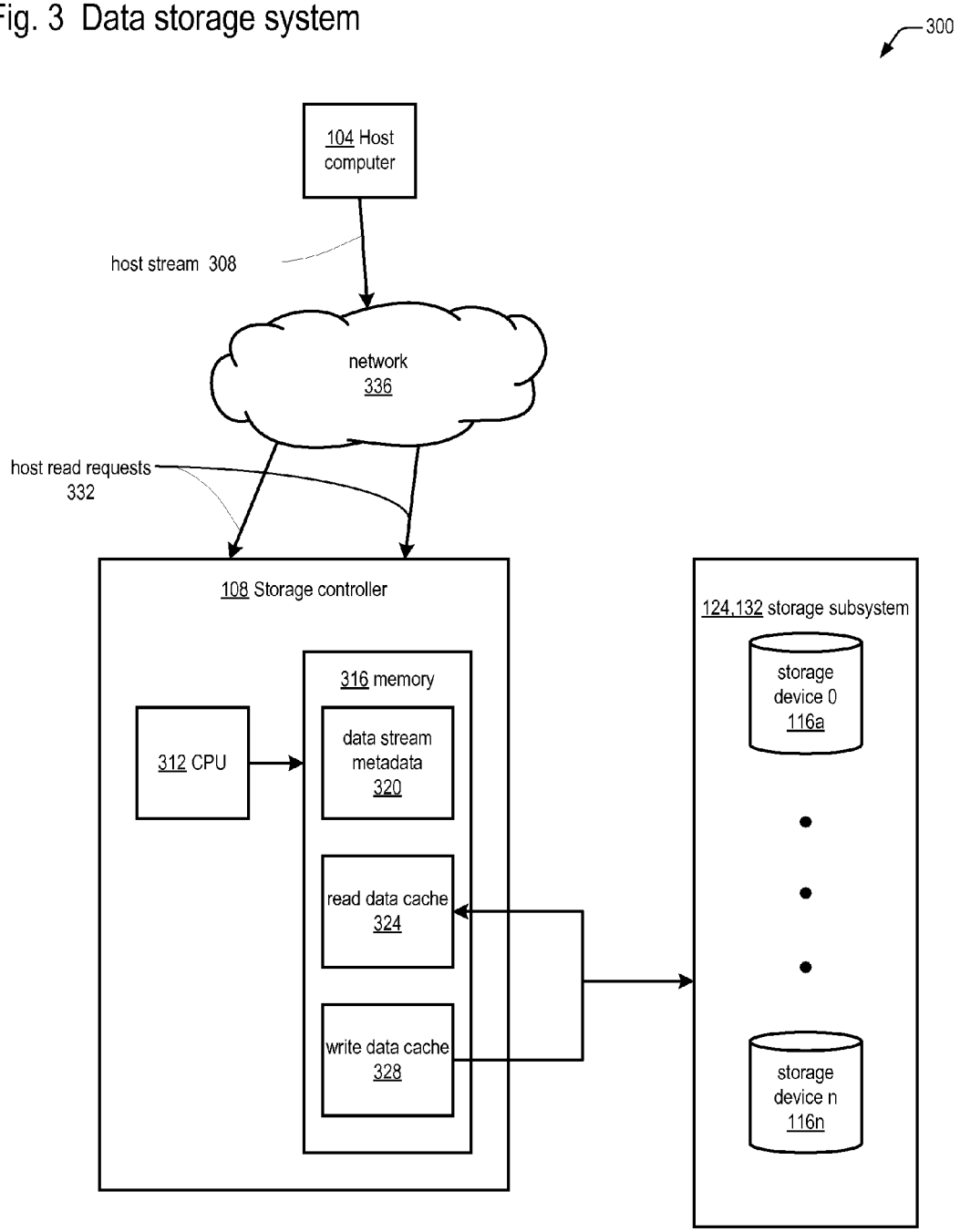

Fig. 4 Host read request
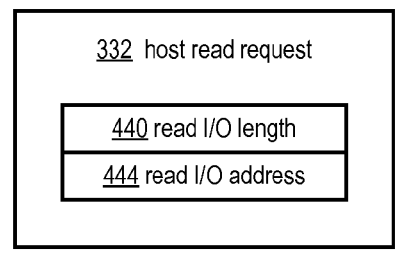

Fig. 5a Sequential forward data stream and metadata
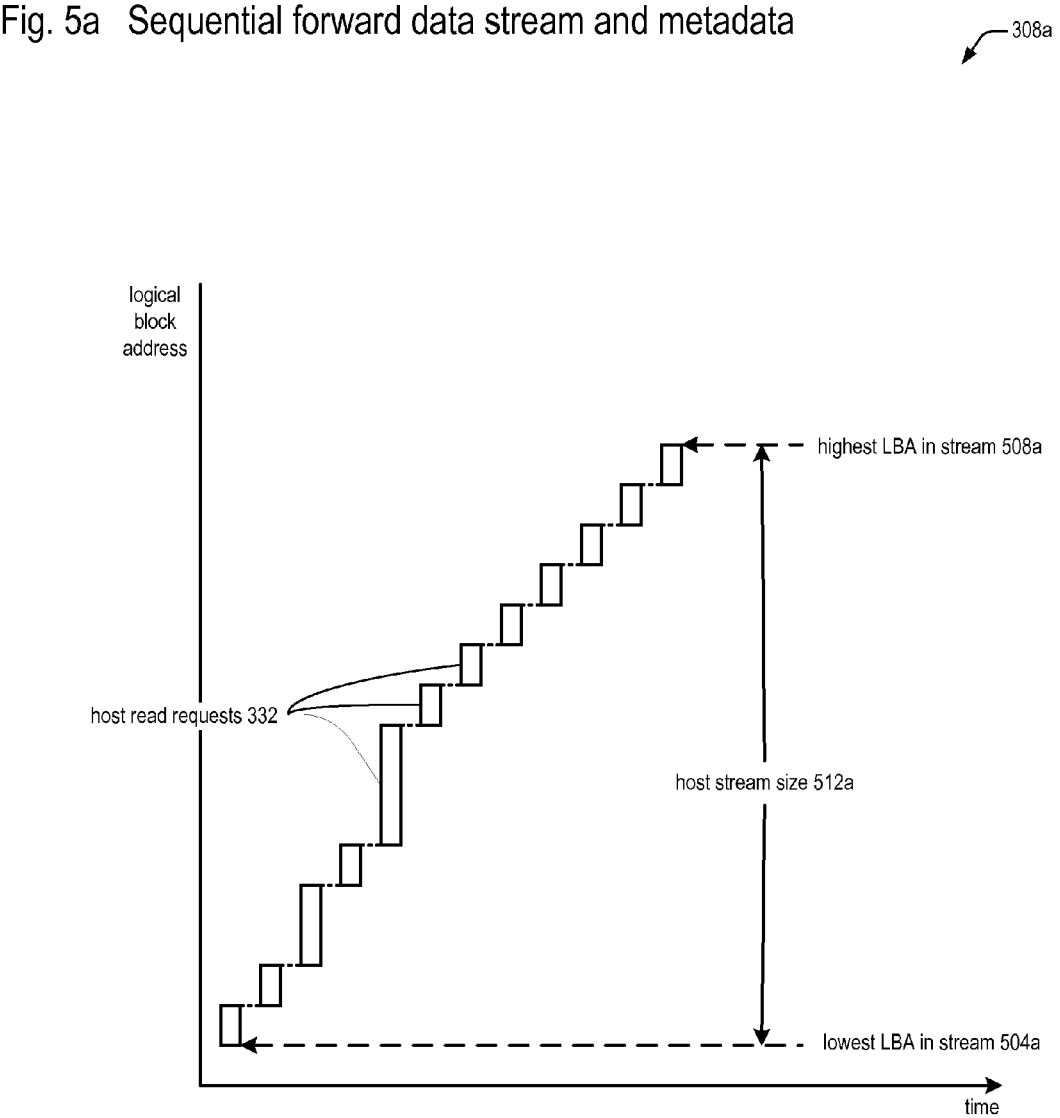

Fig. 5b Sequential reverse data stream and metadata
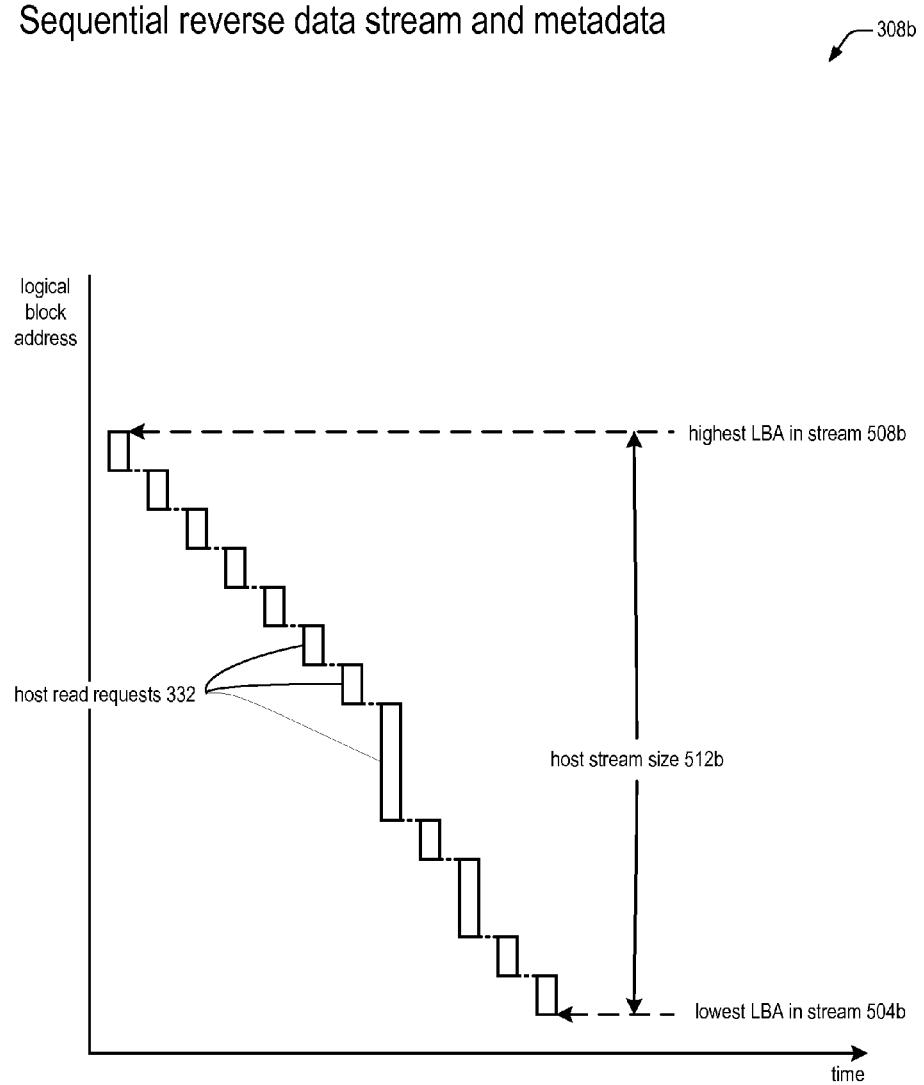

Fig. 6a  metadata
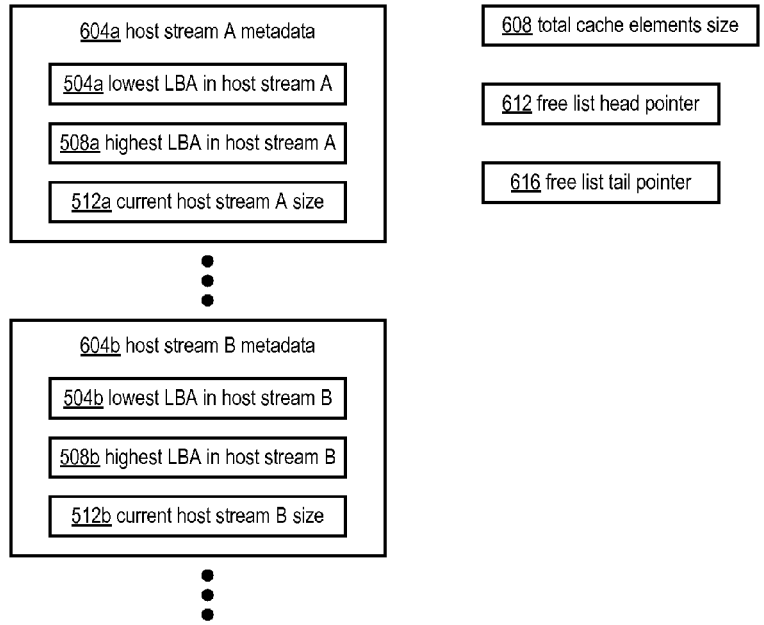
Fig. 6b  cache element reordering during read ahead
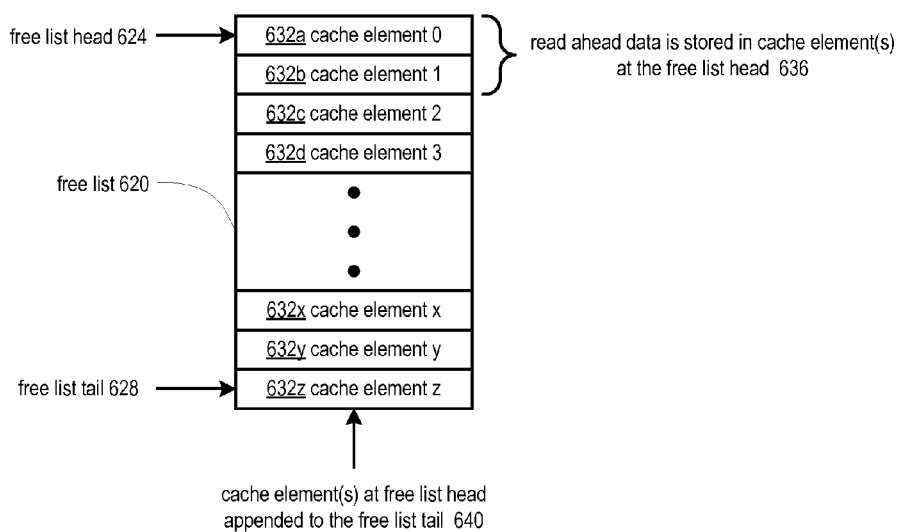

Fig. 7a host data read with stream size greater than read cache size
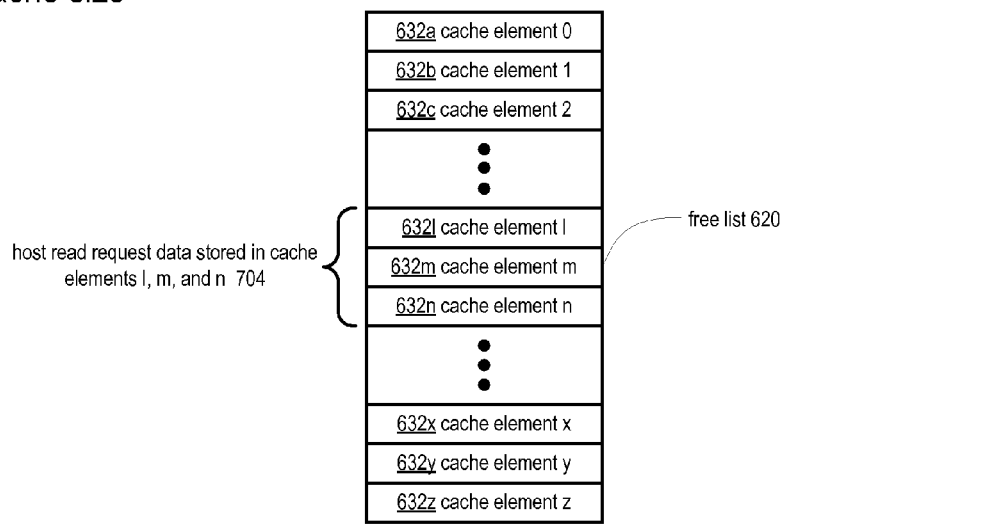
Fig. 7b free list re-ordering following host data read
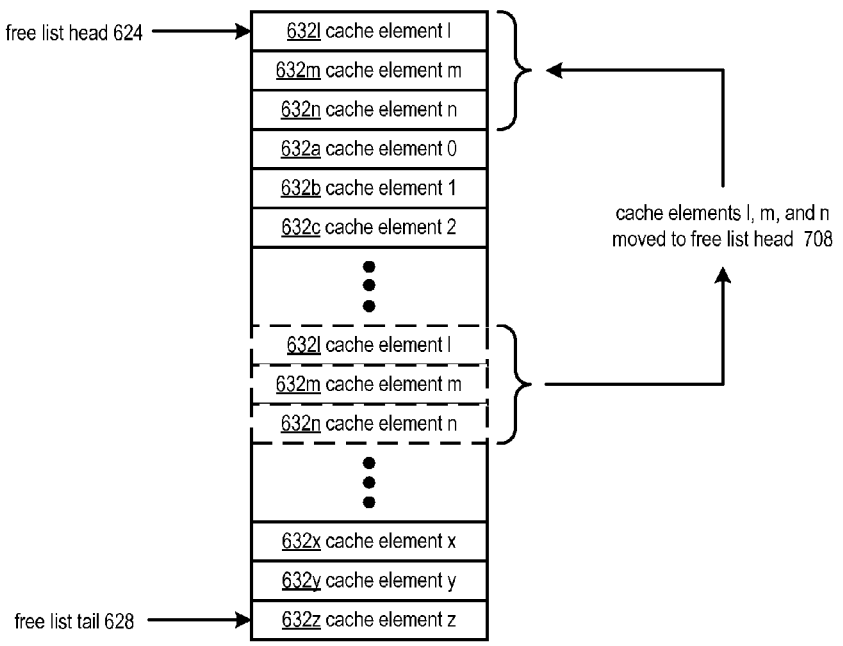

Fig. 8a host data read with stream size less than read cache size
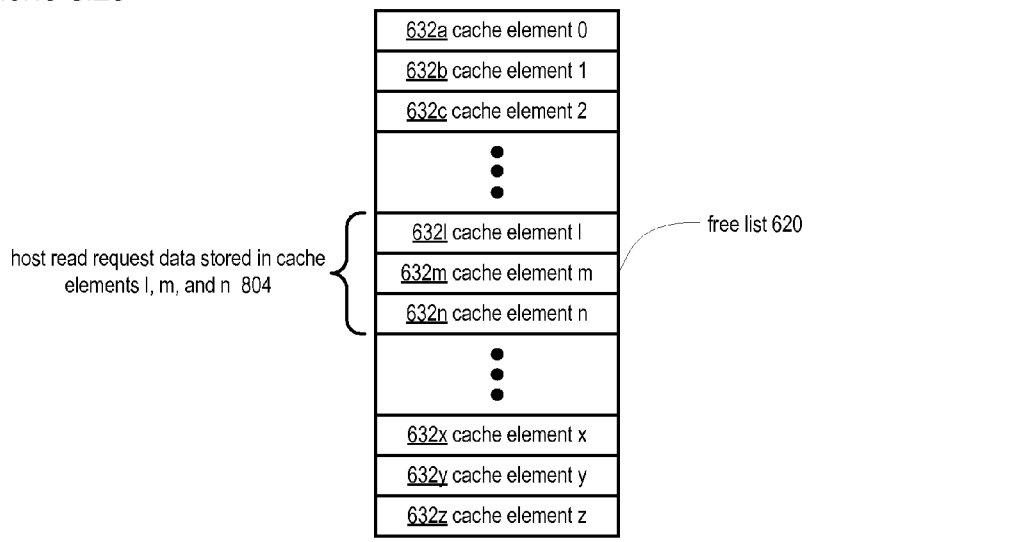
Fig. 8b free list re-ordering following host data read
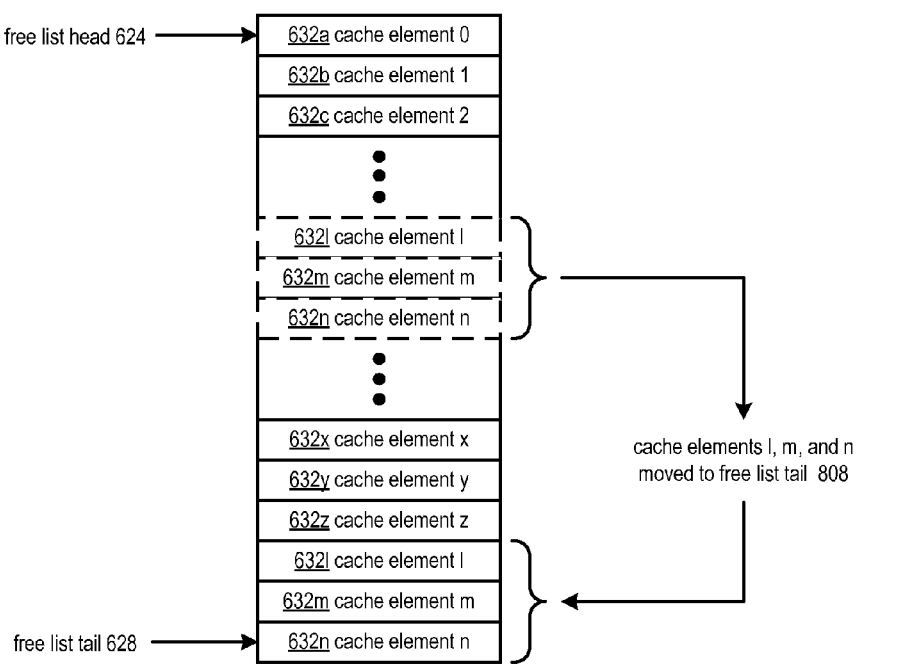

Fig. 9 host stream size calculation process
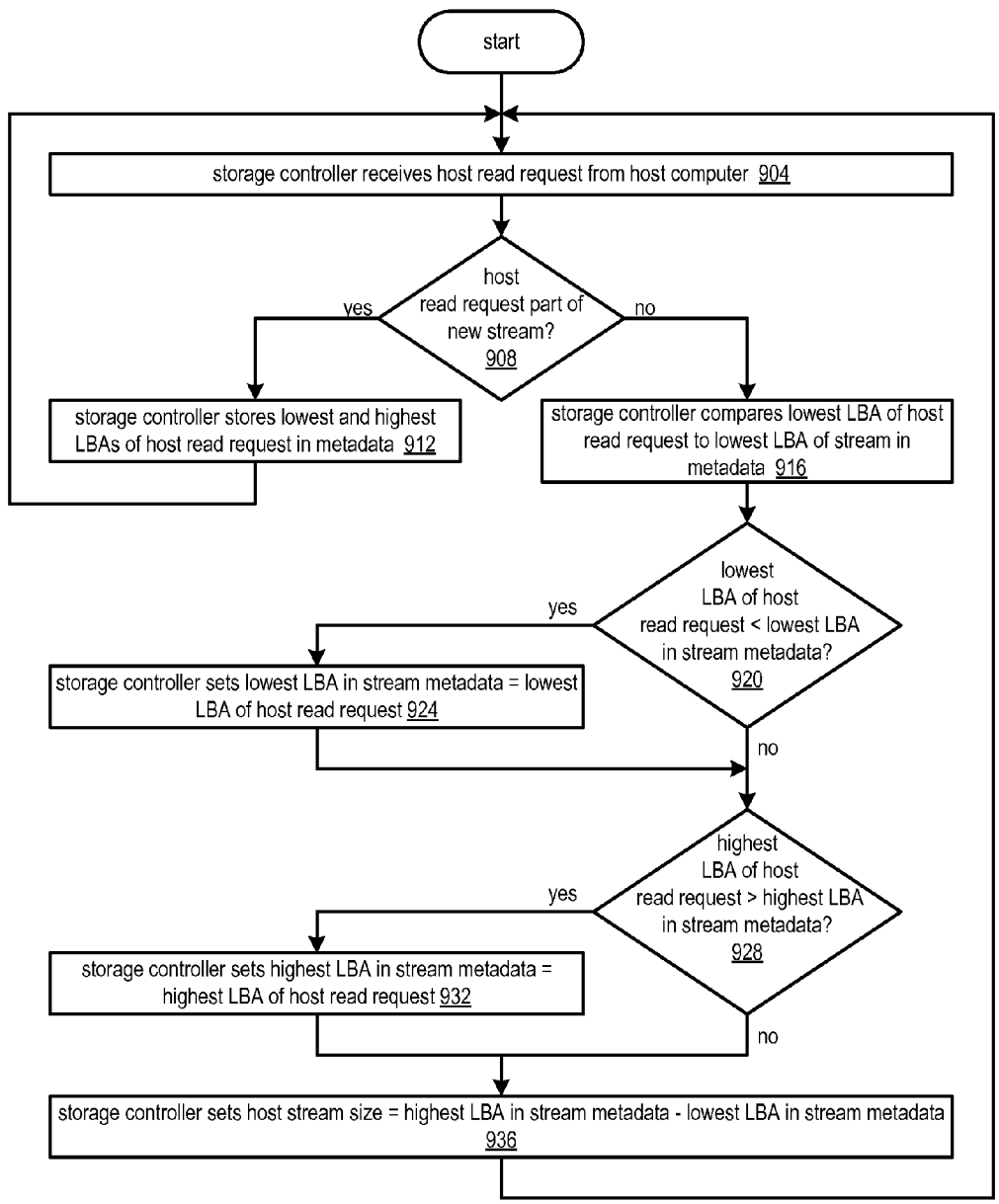

Fig. 10 cache element update process during read ahead
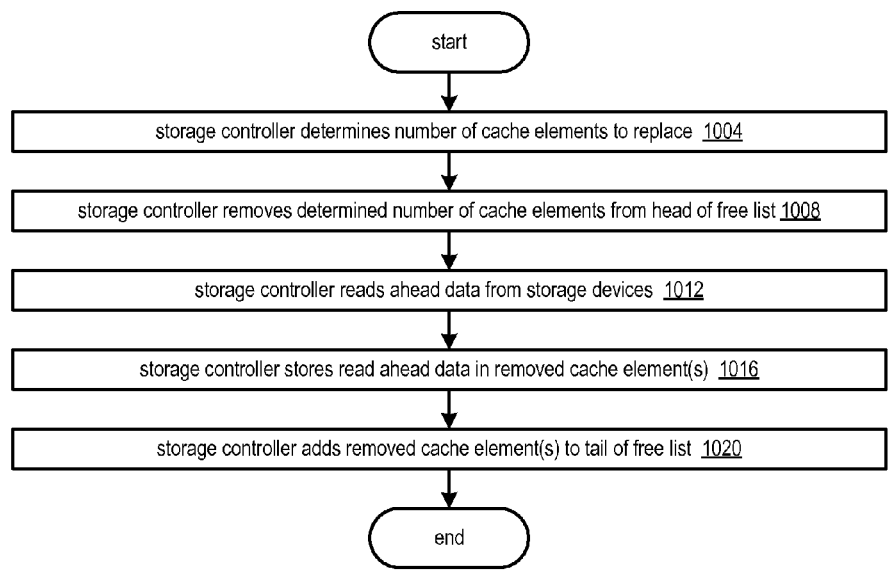

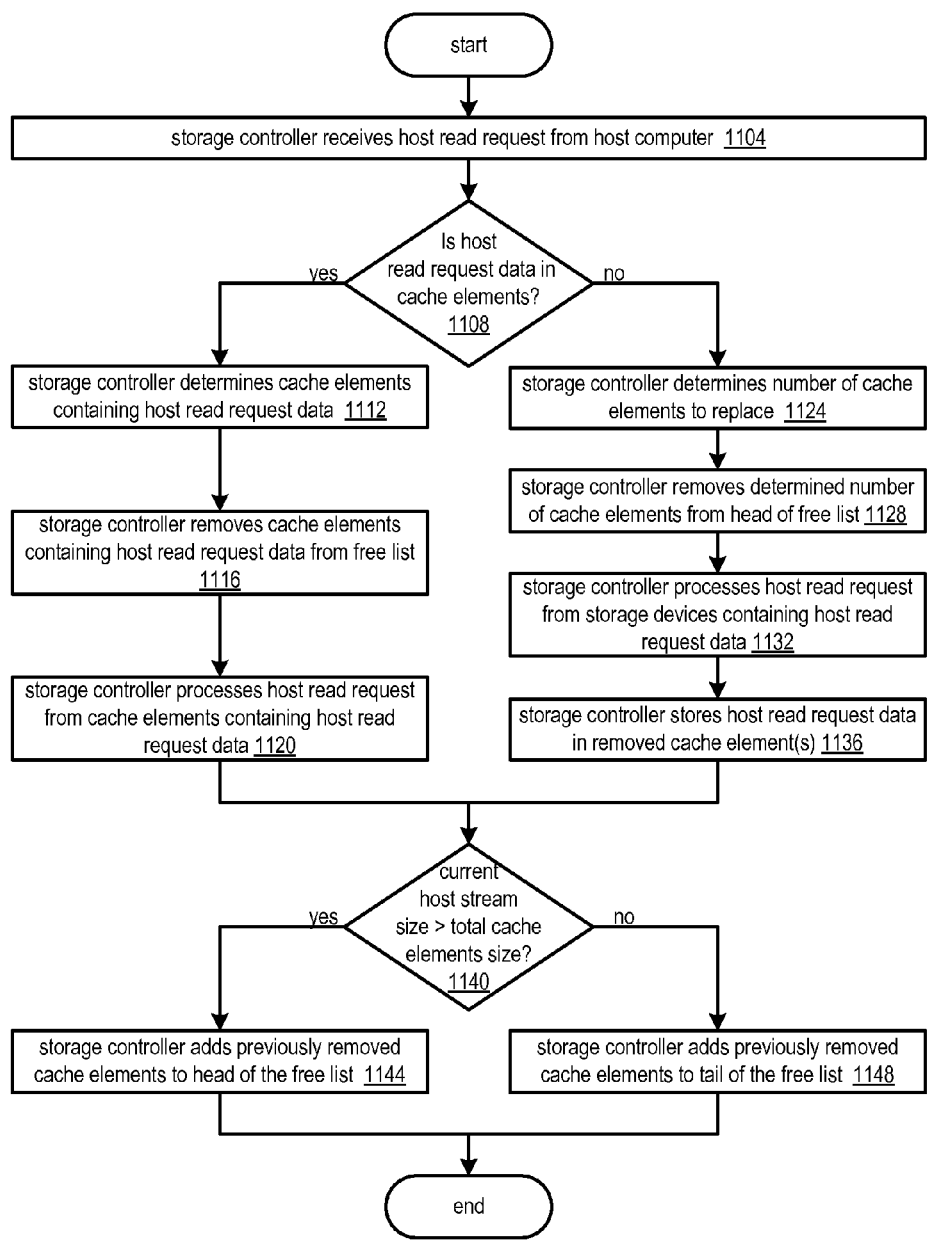
Fig. 11 host stream analysis process

METHOD AND APPARATUS FOR EFFICIENT READ CACHE OPERATION

CROSS REFERENCE TO RELATED APPLICATION(S)

This application claims the benefit of U.S. Provisional Application Ser. No. 61/772,691 filed Mar. 5, 2013, entitled METHOD FOR HEURISTICALLY ABANDONING LRU TO PROMOTE READ AHEAD, which is hereby incorporated by reference for all purposes.

FIELD

The present invention is directed to computer data storage. In particular, the present invention is directed to methods and apparatuses for efficient storage controller read data caching.

BACKGROUND

The need to store digital files, documents, pictures, images and other data continues to increase rapidly. In connection with the electronic storage of data, systems incorporating one or more data storage controllers have been devised. Storage controllers receive data read and write requests from host computers and control one or more physical storage devices to beneficially store or provide the requested data from/to the host computers.

Storage controllers generally buffer read and write data requests, often converting the host data read and write requests into RAID or storage device read or write requests. Many storage controllers store read and write data in cache memories included as part of the storage controllers. Cache memories are small compared to external storage devices such as hard drives, and generally orders of magnitude faster. However, cache memory costs significantly more per byte than storage devices, and therefore cache memory size is correspondingly small in order to be cost effective. The need is always present for cache memories to operate as efficiently as possible in order for overall storage controller performance to be maximized to all interconnected host computers.

Many storage controllers have separate areas of memory dedicated to read cache and write cache. If requested data is in the read cache when a host computer requests the data that is a "cache hit". If requested data is not in the read cache when a host computer requests the data that is a "cache miss". Storage controllers execute caching policies to attempt to maximize the likelihood that requested data will be present in a read cache when the data is requested by a host computer. One of the most common such policies is LRU or "least recently used". LRU policies maintain a log of which data has been present in the read cache for the longest time, and replace that oldest data with newer data that has either been requested by a host read request or in spatial proximity to previous host read requests.

SUMMARY

The present invention is directed to solving disadvantages of the prior art. In accordance with embodiments of the present invention, a method for efficient use of a read cache by a storage controller is provided. The method includes receiving, by the storage controller, a read request from a host computer and determining, by the storage controller, if a host stream size is larger than a read cache size. The host stream size is a current cumulative size of all read requests in the host stream. If the host stream size is larger than the read cache size then migrating data corresponding to the read request, by the storage controller, to a first area of the read cache containing data that has been in the read cache for the longest time. If the host stream size is not larger than the read cache size then migrating data corresponding to the read request, by the storage controller to a second area of the read cache containing data that has been in the read cache for the shortest time. The host stream is a consecutive group of sequential read requests from the host computer, and the storage controller includes the read cache.

In accordance with another embodiment of the present invention, a storage controller providing for efficient use of a read cache is provided. The storage controller includes a processor and a memory, coupled to the processor. The memory includes the read cache and metadata, which includes a host stream size. The host stream size is a current cumulative size of all read requests in a host stream, and the host stream is a consecutive group of sequential read requests from the host computer. The metadata also includes the read cache size. After the storage controller receives a read request from a host computer coupled to the storage controller, the processor determines if the host stream size is larger than the read cache size. If the host stream size is larger than the read cache size, the processor migrates data corresponding to the read request to an area of the read cache containing data that has been in the read cache for the longest time. If the host stream size is not larger than the read cache size the processor migrates data corresponding to the read request to an area of the read cache containing data that has been in the read cache for the shortest time.

In accordance with yet another embodiment of the present invention, a storage system for providing for efficient use of a storage controller read cache is provided. The storage system includes a host computer for providing read requests, a storage controller coupled to the host computer, and one or more storage devices coupled to the storage controller. The storage controller includes a processor and a memory, coupled to the processor. The memory includes the read cache, which includes an ordered list of equal sized cache elements that store read data. A first end of the ordered list stores data that has been in the read cache for the longest time, and a second end of the ordered list stores data that has been in the read cache for the shortest time. The first end of the ordered list is opposite to the second end of the ordered list. The memory also includes metadata, including a host stream size. The host stream size is a current cumulative size of all read requests in a host stream, and the host stream is a consecutive group of sequential read requests from the host computer. The metadata also includes a read cache size, where the read cache size is the cumulative size of all cache elements. After the storage controller receives a read request from the host computer, the processor determines if the host stream size is larger than the read cache size. If the host stream size is larger than the read cache size, the processor migrates data corresponding to the read request to the first end of the ordered list. If the host stream size is not larger than the read cache size, the processor migrates data corresponding to the read request to the second end of the ordered list.

An advantage of the present invention is it provides a method to more efficiently utilize valuable storage controller cache resources. Cache memory is small compared to storage device resources coupled to the storage controller, and common cache update and replacement policies such as Least Recently Used (LRU) may fill the cache with data that is unlikely to be read in the near future.

Another advantage of the present invention is it does not require preserving data when a host stream won't be rereading it. This frees up cache space to service all of the current host streams. Read cache sizes are typically small when compared to the size of common host streams, which can quickly outgrow read cache size. By abandoning the LRU process early in a host stream, the read cache may not be filled as quickly as when using only the LRU process.

Additional features and advantages of embodiments of the present invention will become more readily apparent from the following description, particularly when taken together with the accompanying drawings.

BRIEF DESCRIPTION OF THE DRAWINGS

FIG. 3 is a block diagram illustrating a data storage system in accordance with embodiments of the present invention.

FIG. 4 is a diagram illustrating a host read request in accordance with embodiments of the present invention.

FIG. 5a is a diagram illustrating a sequential forward data stream and metadata in accordance with embodiments of the present invention.

FIG. 5b is a diagram illustrating a sequential reverse data stream and metadata in accordance with embodiments of the present invention.

FIG. 6a is a diagram illustrating metadata stored in the data stream metadata memory in accordance with the preferred embodiment of the present invention.

FIG. 6b is a diagram illustrating cache element reordering during read ahead in accordance with the preferred embodiment of the present invention.

FIG. 7a is a diagram illustrating a host data read with stream size greater than read cache size in accordance with embodiments of the present invention.

FIG. 7b is a diagram illustrating free list re-ordering following a host data read in accordance with embodiments of the present invention.

FIG. 8a is a diagram illustrating a host data read with stream size less than read cache size in accordance with embodiments of the present invention.

FIG. 8b is a diagram illustrating free list re-ordering following a host data read in accordance with embodiments of the present invention.

FIG. 9 is a flowchart illustrating a host stream size calculation process in accordance with the embodiments of the present invention.

FIG. 10 is a flowchart illustrating a cache element update process during read ahead in accordance with embodiments of the present invention.

FIG. 11 is a flowchart illustrating a host stream analysis process in accordance with embodiments of the present invention.

DETAILED DESCRIPTION

The present invention is directed to improvements to read cache performance in a storage controller in response to host computer read requests. Keeping in mind the desire to maintain a small read cache memory to keep the storage controller cost down, it is necessary to improve read cache efficiency and performance.

One way to improve read cache performance is simply to increase the amount of read ahead data as much as possible for each received read request. However, this will usually fill the read cache with useless data that the host computer may never request or may request much later. Additionally, in systems where a storage controller is coupled to multiple host computers, filling a cache with large amounts of read ahead data for a specific host computer may prevent other host computers from utilizing the read cache, severely limiting read performance to the other host computers.

Each host computer issues read data requests based on the applications and other programs executed by that host computer. In most cases, the applications and other programs currently being executed by one host computer is different than the applications and other programs being executed by a different host computer. Each host computer therefore issues a different set of read requests, which are known as a host stream. In general, storage controllers attempt to maintain a static amount of read ahead data in the read cache for each host stream. A given host computer can issue multiple host streams.

When an attached host computer is reading large files, it generally does not return to re-read a previously-read area of storage devices. When this happens, it is not efficient to use the LRU algorithm once the attached host reads the data. In most cases, the data is just taking up needless room in read cache when the read cache space could be used more effectively by a read ahead operation.

While a storage controller is servicing one or more sequential host streams, sometimes the current host stream size is larger than the read cache size. In order to be able to service data requests efficiently when requested read data is in the read cache, the storage controller can employ a cache optimization process that temporarily abandons the LRU algorithm and frees up read cache space that most likely will not be read in the near future.

What is needed is a storage controller that maintains only enough read ahead data in read cache for each host stream so that cache hits are maximized while reducing un-needed space allocated to unused read ahead data that has already been read by the host computer.

Figure 1A:
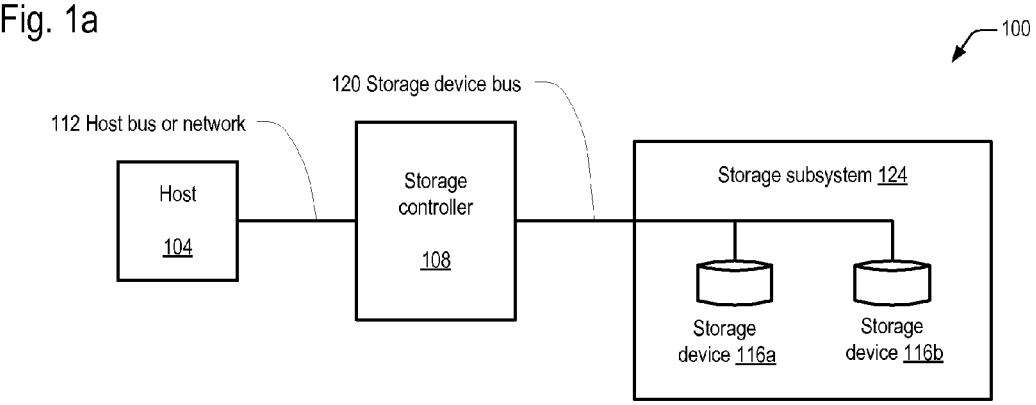
FIG. 1a is a block diagram illustrating components of a first non host-based data storage system in accordance with embodiments of the present invention.

Referring now to FIG. 1a, a block diagram illustrating components of a first non host-based data storage system 100 in accordance with embodiments of the present invention is shown.

The data storage system 100 includes one or more host computers 104. Host computer 104 is generally a server, but could also be a desktop or mobile computer. Host computer 104 executes application programs that generate read and write requests to storage controller 108 over host bus or network 112. Host bus or network 112 in one embodiment is a bus such as SCSI, FC-AL, USB, Firewire, SSA, SAS, SATA, or Infiniband. In another embodiment, host bus or network 112 is a network such as Ethernet, iSCSI, Fiber Channel, SSA, ESCON, ATM, FICON, or Infiniband.

Host computer 104 interfaces with one or more storage controllers 108, although only a single storage controller 108 is illustrated for clarity. In one embodiment, storage controller 108 is a RAID controller. In another embodiment, storage controller 108 is a storage appliance such as a provisioning, virtualization, replication, or backup appliance. Storage controller 108 transfers data to and from storage devices 116a, 116b in storage subsystem 124, over storage device bus 120. Storage device bus 120 is any suitable storage bus or group of buses for transferring data directly between storage controller 108 and storage devices 116, including but not limited to SCSI, Fiber Channel, SAS, SATA, or SSA.

Storage subsystem 124 in one embodiment contains twelve storage devices 116. In other embodiments, storage subsystem 124 may contain fewer or more than twelve storage devices 116. Storage devices 116 include various types of storage devices, including hard disk drives, solid state drives, optical drives, and tape drives. Within a specific storage device type, there may be several sub-categories of storage devices 116, organized according to performance. For example, hard disk drives may be organized according to cache size, drive RPM (5,400, 7,200, 10,000, and 15,000, for example), queue depth, random transfer rate, or sequential transfer rate.

Figure 1B:
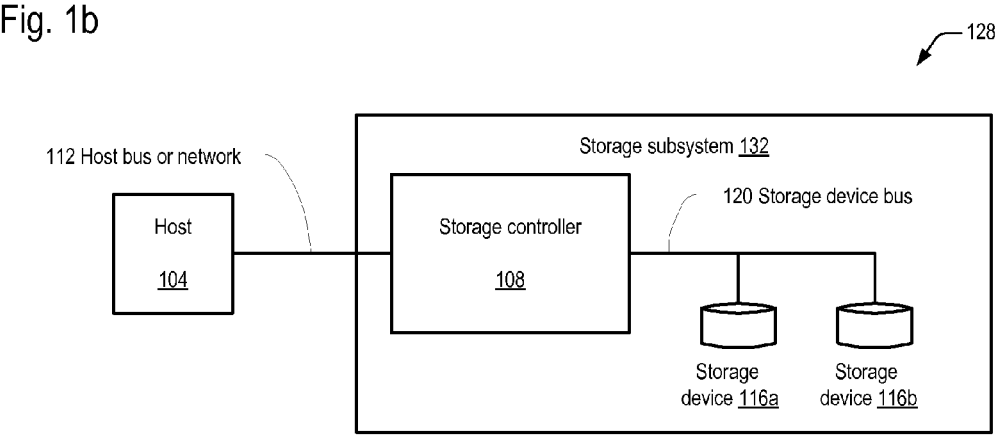
FIG. 1b is a block diagram illustrating components of a second non host-based data storage system in accordance with embodiments of the present invention.

Referring now to FIG. 1b, a block diagram illustrating components of a second non host-based data storage system 128 in accordance with embodiments of the present invention is shown. Non host-based data storage system 128 is similar to non host-based data storage system 100, with the exception being storage controller 108 is within storage subsystem 132, along with storage devices 116. In the embodiment illustrated in FIG. 1b, storage controller 108 is a single RAID controller 108. However, in other embodiments, storage controller 108 represents multiple RAID controllers 108.

Figure 1C:
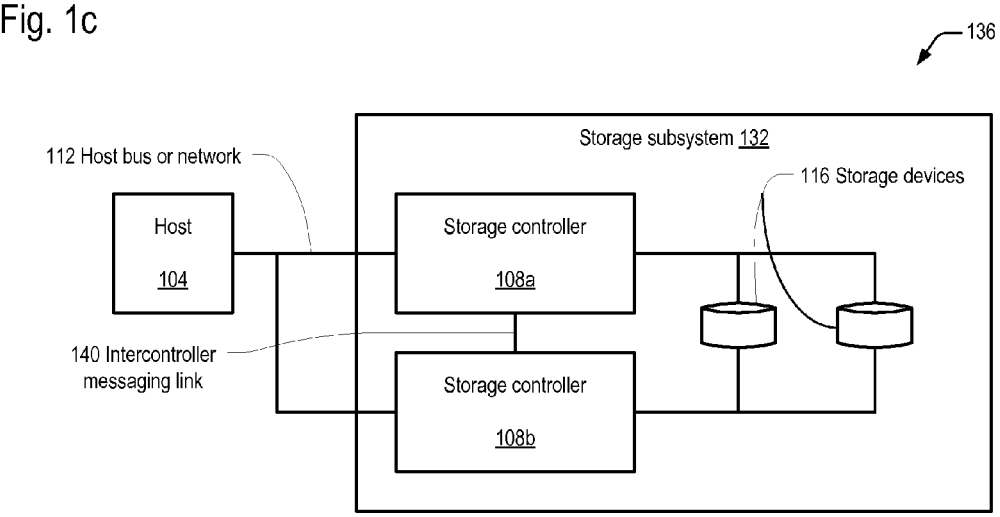
FIG. 1c is a block diagram illustrating components of a third non host-based data storage system in accordance with embodiments of the present invention.

Referring now to FIG. 1c, a block diagram illustrating components of a third host-based data storage system 136 in accordance with embodiments of the present invention is shown. Data storage system 136 is similar to data storage systems 100 and 128, except storage controller 108 represents two redundant storage controllers 108a, 108b. In one embodiment, storage controllers 108a, 108b utilize active-active failover in order to have continued availability to storage devices 116 by host 104 in the event of a failure of one of storage controllers 108a, 108b. Inter-controller messaging link 140 provides a communication and data path between storage controllers 108a, 108b in order to mirror write data and synchronize failover and failback operations.

Figure 2A:
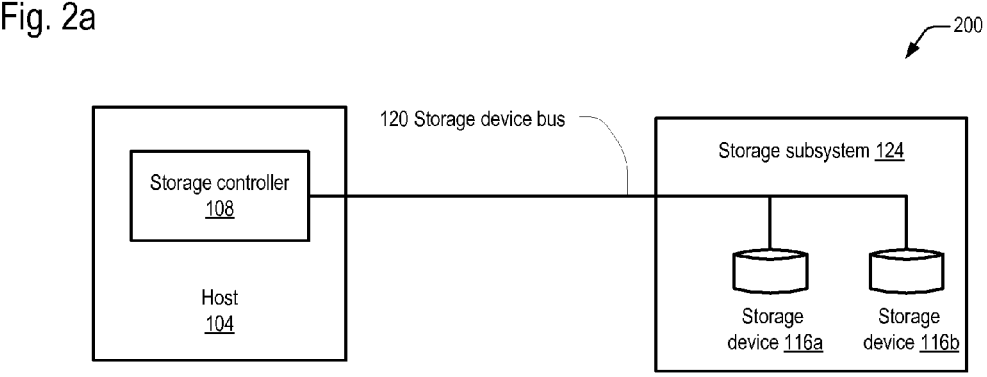
FIG. 2a is a block diagram illustrating components of a first host-based data storage system in accordance with embodiments of the present invention.

Referring now to FIG. 2a, a block diagram illustrating components of a first host-based data storage system 200 in accordance with embodiments of the present invention is shown. First host-based data storage system 200 is similar to first non host-based storage system 100 of FIG. 1a, except storage controller 108 is within host computer 104. Storage controller 108 interfaces through a local bus of host computer 104, where the local bus may be any suitable bus for high speed transfers between the CPU of host computer 104 and storage controller 108, including Rapid IO, PCI, PCI-X, or PCI Express. Storage controller 108 may either be integrated on the motherboard of host computer 104, or may be an add-in board or other form of assembly in host computer 104.

Figure 2B:
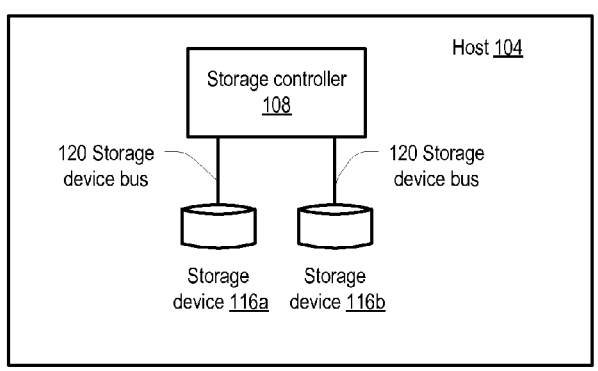
FIG. 2b is a block diagram illustrating components of a second host-based data storage system in accordance with embodiments of the present invention.

Referring now to FIG. 2b, a block diagram illustrating components of a second host-based data storage system 204 in accordance with embodiments of the present invention is shown. Second host-based data storage system 204 integrates the functions of storage subsystem 124 into host computer 104. Data storage system 204 represents a self-contained highly integrated data storage system.

Figure 2C:
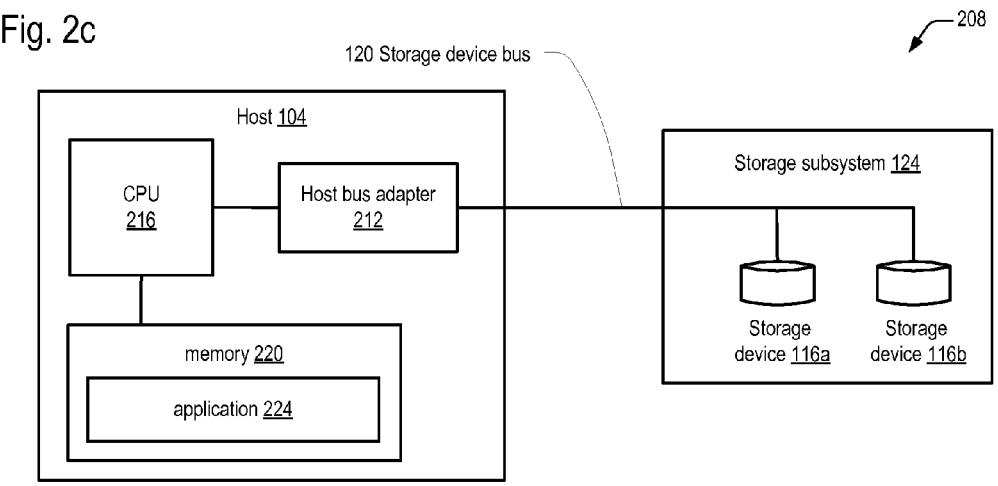
FIG. 2c is a block diagram illustrating components of a third host-based data storage system in accordance with embodiments of the present invention.

Referring now to FIG. 2c, a block diagram of illustrating components of a third host-based data storage system 208 in accordance with embodiments of the present invention is shown. Third host-based data storage system 208 is similar to first host-based data storage system 200, but instead of an integrated storage controller 108, a software-based approach is used. Interface between host computer 104 and storage device bus 120 is provided by host bus adapter 212, which provides appropriate data and command buffering functions as well as protocol control and low-level error handling. CPU 216 executes applications 224 in memory 220 to control data flow between memory 220 and storage devices 116a, 116b in storage subsystem 124.

Referring now to FIG. 3, a block diagram illustrating a data storage system 300 in accordance with embodiments of the present invention is shown. Data storage system 300 includes one or more host computers 104 interconnected to a storage controller 108 through bus or network 336. Host computer 104 generates a host stream 308, which includes one or multiple groups of host read requests 332.

Storage controller 108 includes a CPU or processor 312, which executes program instructions stored in a memory 316 coupled to the CPU 312. CPU 312 includes any processing device suitable for executing storage controller 108 programs, such as Intel x86-compatible processors, embedded processors, mobile processors, and/or RISC processors. CPU 312 may include several devices including field-programmable gate arrays (FPGAs), memory controllers, North Bridge devices, and/or South Bridge devices.

Memory 316 may be one or more forms of volatile memory 316, non-volatile memory 316, or a combination of both volatile and non-volatile memories 316. The memory 316 includes firmware which includes program instructions that CPU 312 fetches and executes, including program instructions for the processes of the present invention. Examples of non-volatile memory 316 include, but are not limited to, flash memory, SD, EPROM, EEPROM, hard disks, and NOVRAM. Volatile memory 316 stores various data structures and user data. Examples of volatile memory 316 include, but are not limited to, SRAM, DDR RAM, DDR2 RAM, DDR3 RAM, Z-RAM, TTRAM, A-RAM, ETA RAM, and other forms of temporary memory.

Memory 316 includes a read data cache 324, also known as a read cache, and in some embodiments a write data cache 328, which provide improved read and write performance, respectively, to the host computer 104. Memory 316 also includes data stream metadata 320. Data stream metadata 320 stores parameters related to host read requests 332, and are used to control read ahead operations and allocation decisions to the read data cache 324.

Storage controller 108 is coupled to storage subsystem 124, 132, which includes one or more storage devices 116a-116n. The most recently accessed data is read from storage devices 116 into the read data cache 324, where it can be provided in response to host read requests 332 much faster than directly from the storage devices 116.

It should be understood that storage controller 108 may be functionally organized in countless different functional organizations and architectures without diverting from the scope or operation of the present invention.

Referring now to FIG. 4, a diagram illustrating a host read request 332 in accordance with embodiments of the present invention is shown. Each host read request 332 includes a read I/O length 440 and a read I/O address 444. Read I/O length 440 is the number of blocks or bytes to be read from storage devices 116, and the read I/O address 444 is the starting address the host read request 332 will be read from.

Referring now to FIG. 5a, a diagram illustrating a sequential forward data stream 308a and metadata in accordance with embodiments of the present invention is shown. Sequential forward data stream 308a includes host read requests 332. A host computer 104 issues host read requests 332 for the sequential forward data stream 308a in ascending order, where the starting address for a next host read request 332 is just following the ending address for the immediately previous host read request 332.

When a storage controller 108 detects a sequential forward data stream 308a, the lowest Logical Block Address (LBA) 504a for the sequential forward data stream 308a is stored in data stream metadata 320 in the storage controller memory 316. When a storage controller 108 detects the end of a sequential forward data stream 308a, the highest Logical Block Address (LBA) 508a for the sequential forward data stream 308a is stored in data stream metadata 320 in the storage controller memory 316.

The difference between the highest LBA in the sequential forward data stream 508a and the lowest LBA in the sequential forward data stream 504a is the host stream size 512a, which is also stored in the data stream metadata 320 in the storage controller memory 316.

Referring now to FIG. 5b, a diagram illustrating a sequential reverse data stream 308b and metadata in accordance with embodiments of the present invention is shown. Although many data streams 308 are sequential forward data streams 308a, in some cases including reverse video playback data streams 308 are sequential reverse data streams 308b. Sequential reverse data stream 308b includes host read requests 332. A host computer 104 issues host read requests 332 for the sequential reverse data stream 308b in descending order, where the starting address for a next host read request 332 is just below the ending address for the immediately previous host read request 332.

When a storage controller 108 detects a sequential reverse data stream 308b, the highest Logical Block Address (LBA) 508b for the sequential reverse data stream 308b is stored in data stream metadata 320 in the storage controller memory 316. When a storage controller 108 detects the end of a sequential reverse data stream 308b, the lowest Logical Block Address (LBA) 504b for the sequential reverse data stream 308b is stored in data stream metadata 320 in the storage controller memory 316.

The difference between the highest LBA in the sequential reverse data stream 508b and the lowest LBA in the sequential reverse data stream 504b is the host stream size 512b, which is also stored in the data stream metadata 320 in the storage controller memory 316.

In some cases, a data stream 308 may be a sequential forward data stream 308a for part of the data stream 308, and a sequential reverse data stream 308b for a different part of the same data stream 308.

Referring now to FIG. 6a, a block diagram illustrating metadata stored in the data stream metadata 320 in accordance with the preferred embodiment of the present invention is shown. The data stream metadata 320 stores parameters used in the process of the present invention.

The data stream metadata 320 includes parameters for one or more host streams 308. Multiple host streams 308 may be issued by multiple host computers 104, or a single host computer 104. Each host stream 308 has associated host stream metadata 604.

Host stream metadata 604 includes three parameters used in FIGS. 9-11 of the present invention. A lowest LBA (starting address) in host stream 504, highest LBA in host stream 508, and current host stream size 512 is stored for each host stream 308. The current host stream size 512 is the difference between the highest LBA in host stream 508 and the lowest LBA in host stream 504.

The data stream metadata 320 also stores a total cache elements size 608. The read data cache 324 is divided into an equal number of cache elements 632. The total cache elements size 608 is the read data cache 324 size. In one embodiment the read data cache size 608 is 798.8 Megabytes (MB), and there are 49,925 cache elements 632 in the read data cache 324. This means that each cache element 632 is 16 Kilobytes (KB) in size. In other embodiments, the read data cache size 608 is less than or more than 798.8 Megabytes (MB) and there are other than 49,925 cache elements 632 in the read data cache 324.

The data stream metadata 320 also includes a free list head pointer 612 and a free list tail pointer 616. The free list head pointer 612 and free list tail pointer 616 are discussed in more detail with respect to FIG. 6b.

Referring now to FIG. 6b, a block diagram illustrating cache element 632 reordering during read ahead in accordance with the preferred embodiment of the present invention is shown. The read data cache 324 is organized into a predetermined number of cache elements 632. A free list 620 is an ordered sequential list of cache elements 632. In the preferred embodiment, the free list 620 is organized as a linked list. A linked list is a data structure consisting of a group of nodes which together represent a sequence. Each item in the linked list provides a data element as well as a pointer to the next node in the data structure.

The free list 620 includes cache elements 632 containing valid read data from storage devices 116. In some cases, the read data in cache elements 632 is from a cache read ahead operation. In other cases, the read data in cache elements 632 is provided in direct response to a host read request 332. The free list 620 has a free list head 624 and a free list tail 628. The free list head 624 and free list tail 628 are identified by the free list head pointer 612 and free list tail pointer 616, respectively, in the data stream metadata 320. The free list head 624 and free list tail 628 are the first and second ends, respectively, of the free list 620.

The cache elements 632 at the free list head 624 are the oldest cache elements 632 in the read data cache 324, and the cache elements 632 at the free list tail 628 are the newest cache elements 632 in the read data cache 324. Therefore, the most recently used cache elements 632 are found at the free list tail 628, and the least recently used cache elements 632 are found at the free list head 624.

In a read ahead operation, the storage controller 108 predicts which data will next be required from host computers 104 and reads that data into the read data cache 324. In the case of a sequential forward data stream 308b, the read ahead data will have a higher LBA than the read request operation currently being processed by the storage controller 108. In the case of a sequential reverse data stream 308b, the read ahead data will have a lower LBA than the read request operation currently being processed by the storage controller 108.

With respect to the free list 620, the storage controller 108 first stores the read ahead data in cache elements 632 at the head of the free list 624, and second appends those cache elements 632 to the free list tail 628. In this way, the newest data in the read data cache 324 is at the free list tail 628. If cache elements 632a and 632b include the read ahead data, they are moved to the free list tail 628, and cache element 632c then becomes the oldest data in the read data cache 324 after the read ahead data is appended to the free list tail 628.

Referring now to FIG. 7a, a diagram illustrating a host data read with stream size 512 greater than read cache size 608 in accordance with embodiments of the present invention is shown. Free list 620 includes cache elements 632, identified as cache element 0 632a through cache element z 632z. In the illustrated host data read, the requested data is already in the read data cache 704, stored in cache element l 632l, cache element m 632m, and cache element n 632n.

Referring now to FIG. 7b, a diagram illustrating free list 620 re-ordering following a host data read in accordance with embodiments of the present invention is shown. FIG. 7b illustrates the re-ordering process following the host data read directed to cache elements 632l, 632m, and 632n of FIG. 7a, after the storage controller 108 has determined the stream size 512 is greater than the data read cache size 608. Since the stream size 512 is greater than the data read cache size 608, the storage controller 108 moves cache elements 632l, 632m, and 632n containing the requested data to the free list head 708, or first area of the read cache 324. Following the move, cache elements 632l, 632m, and 632n are no longer present at the old locations illustrated in FIG. 7a, but are now available at the free list head 624, before cache elements 0 632a, 1 632b, and 2 632c. This makes cache elements l 632l, m 632m, and n 632n positioned as the oldest cache elements 632 in the read data cache 324, and the first cache elements 632 to be replaced during a read ahead operation. The process steps illustrated in FIGS. 7a and 7b are shown in FIG. 11 steps 1112-1120, 1140, and 1144.

Referring now to FIG. 8a, a diagram illustrating a host data read with stream size 512 less than read cache size 608 in accordance with embodiments of the present invention is shown. Free list 620 includes cache elements 632, identified as cache element 0 632a through cache element z 632z. In the illustrated host data read, the requested data is already in the read data cache 804, stored in cache element l 632l, cache element m 632m, and cache element n 632n.

Referring now to FIG. 8b, a diagram illustrating free list 620 re-ordering following a host data read in accordance with embodiments of the present invention is shown. FIG. 8b illustrates the re-ordering process following the host data read directed to cache elements l, m, and n of FIG. 8a, after the storage controller 108 has determined the stream size 512 is less than the data read cache size 608. Since the stream size 512 is less than the data read cache size 608, the storage controller 108 moves cache elements 632l, 632m, and 632n containing the requested data to the free list tail 808, or second area of the read cache 324. Following the move, cache elements 632l, 632m, and 632n are no longer present at the old locations illustrated in FIG. 8a, but are now available at the free list tail 628, after cache elements x 632x, y 632y, and z 632z. This makes cache elements l 632l, m 632m, and n 632n positioned as the newest cache elements 632 in the read data cache 324, and the last cache elements 632 to be replaced during a read ahead operation. The process steps illustrated in FIGS. 8a and 8b are shown in FIG. 11 steps 1112-1120, 1140, and 1148.

Referring now to FIG. 9, a flowchart illustrating a host stream size 512 calculation process in accordance with the embodiments of the present invention is shown. Flow begins at block 904.

At block 904, the storage controller 108 receives a host read request 332 from a host computer 104. Flow proceeds to decision block 908.

At decision block 908, the storage controller 108 determines if the host read request 332 is part of a new host stream 308 or an already existing host stream 308. If the host read request 332 is part of a new host stream 308, then flow proceeds to block 912. If the host read request 332 is not part of a new host stream 308, then flow proceeds to block 916.

At block 912, the storage controller 108 stores the lowest 504 and highest 508 LBAs of the received host read request 332 in data stream metadata 320. Flow returns to block 904 to await a next host read request 332.

At block 916, the storage controller 108 compares the lowest LBA of the received host read request 332 to the lowest LBA 508 of the stream including the host read request 332 in stream metadata 604. Flow proceeds to decision block 920.

At decision block 920, the storage controller 108 determines if the lowest LBA of the host read request 332 received in block 904 is less than the lowest LBA 504 in stream metadata 604. If the lowest LBA of the host read request 332 received in block 904 is less than the lowest LBA 504 in stream metadata 604, then flow proceeds to block 924. If the lowest LBA of the host read request 332 received in block 904 is not less than the lowest LBA 504 in stream metadata 604, then flow proceeds to decision block 928.

At block 924, the storage controller 108 sets the lowest LBA 504 in stream metadata 604 equal to the lowest LBA of the host read request 332 received in block 904. The lowest LBA of the host read request 332 received in block 904 is equal to the read I/O address 444 of the host read request 332. Flow proceeds to decision block 928.

At decision block 928, the storage controller 108 determines if the highest LBA of the host read request 332 received in block 904 is greater than the highest LBA 508 in stream metadata 604. If the highest LBA of the host read request 332 received in block 904 is greater than the highest LBA 508 in stream metadata 604, then flow proceeds to block 932. If the highest LBA of the host read request 332 received in block 904 is not greater than the highest LBA 508 in stream metadata 604, then flow proceeds to block 936.

At block 932, the storage controller 108 sets the highest LBA 508 in stream metadata 604 equal to the highest LBA of the host read request 332 received in block 904. The highest LBA of the host read request 332 received in block 904 is equal to the sum of the read I/O address 444 and the read I/O length 440 of the host read request 332. Flow proceeds to block 936.

At block 936, the storage controller 108 sets the host stream size 512 equal to the highest LBA 508 in stream metadata 604 minus the lowest LBA 504 in stream metadata 604. Flow proceeds to at block 904.

Referring now to FIG. 10, a flowchart illustrating a cache element 632 update process during read ahead in accordance with embodiments of the present invention is shown. Flow begins at block 1004.

At block 1004, the storage controller 108 determines the number of cache elements 632 to replace. The number of cache elements 632 to replace depends on the cache element 632 size, the read data cache size 608, and the desired amount of read ahead data to fetch from storage devices 116. In the preferred embodiment where the storage devices 116 are striped, two stripes are generally the amount of data brought into the read data cache 324 during a read ahead operation. Flow proceeds to block 1008.

At block 1008, the storage controller 108 removes the determined cache elements 632 from the head of the free list 624. Flow proceeds to block 1012.

At block 1012, storage controller 108 reads read ahead data from storage devices 116. Flow proceeds to block 1016.

At block 1016, the storage controller 108 stores the read ahead data from block 1004 in the removed cache elements 636. Flow proceeds to block 1020.

At block 1020, the storage controller 108 adds the removed cache elements 640 to the tail of the free list 628. Flow ends at block 1020.

Referring now to FIG. 11, a flowchart illustrating a host stream 308 analysis process in accordance with embodiments of the present invention is shown. Flow begins at block 1104.

At block 1104, the storage controller 108 receives a host read request 332 from a host computer 104. Flow proceeds to decision block 1108.

At decision block 1108, the storage controller 108 determines if the read request data corresponding to the host read request 332 of block 1104 is present in the cache elements 632. If the read request data corresponding to the host read request 332 of block 1104 is present in the cache elements 632, then flow proceeds to block 1112. If the read request data corresponding to the host read request 332 of block 1104 is not present in the cache elements 632, then flow proceeds to block 1124.

At block 1112, the storage controller 108 determines the cache elements 632 containing the host read request data. Flow proceeds to block 1116.

At block 1116, the storage controller 108 removes the cache elements 632 containing the host read request data from the free list 620. Flow proceeds to block 1120.

At block 1120, the storage controller 108 processes the host read request 332 from cache elements 632 containing the host read request data. Flow proceeds to decision block 1140.

At block 1124, the storage controller 108 determines the number of cache elements 632 to replace. Flow proceeds to block 1128.

At block 1128, the storage controller 108 removes the determined number of cache elements 632 from block 1124 from the head of the free list 624. Flow proceeds to block 1132.

At block 1132, the storage controller 108 processes the host read request 332 from block 1104 from storage devices 116 containing the host read request data. Flow proceeds to block 1136.

At block 1136, the storage controller 108 stores the host read request data in the removed cache elements 632 from block 1128. Flow proceeds to decision block 1140.

At decision block 1140, the storage controller 108 determines if the current host stream size 512 is greater than the total cache elements size 608. The total cache elements size 608 is the size of the read data cache 324. If the current host stream size 512 is greater than the total cache elements size 608, then flow proceeds to block 1144. If the current host stream size 512 is not greater than the total cache elements size 608, then flow proceeds to block 1148.

If the host stream size 512 is larger than read data cache size 608, this means the host stream 308 is large and the storage controller 108 will perform better by using all read data cache 324 for read ahead data, rather than maintaining older cache elements 632 in case those cache elements 632 are again re-read. If the host stream size 512 is smaller than the read data cache size 608, this means the storage controller 108 should maintain read data cache 324 data as long as possible via the LRU update process and attempt to promote read data cache 324 hits in the event of data being re-read in the future.

At block 1144, the storage controller 108 adds the previously removed cache elements 632 from blocks 1116 and 1128 to the head of the free list 624. Flow ends at block 1144.

At block 1148, the storage controller 108 adds the previously removed cache elements 632 from blocks 1116 and 1128 to the tail of the free list 628. Flow ends at block 1148.

Although the process steps of the present invention describe the storage controller 108 performing the actions, it is understood by one of ordinary skill in the art that a CPU or processor 312 generally performs these steps. However, in other embodiments, one or more processors, state machines, programmable logic devices, or other devices may perform these steps.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A method for efficient use of a read cache by a storage controller, comprising:
   receiving, by the storage controller, a read request from a host computer; and
   determining, by the storage controller, if a host stream size is larger than a read cache size, wherein the host stream size is a current cumulative size of all read requests in the host stream;
      if the host stream size is larger than the read cache size then migrating data corresponding to the read request, by the storage controller, to a first area of the read cache containing data that has been in the read cache for the longest time; and
      if the host stream size is not larger than the read cache size then migrating data corresponding to the read request, by the storage controller to a second area of the read cache containing data that has been in the read cache for the shortest time,
   wherein the host stream is a consecutive group of sequential read requests from the host computer, wherein the storage controller comprises the read cache.

2. The method for efficient use of a read cache by a storage controller of claim 1, wherein before determining if the host stream size is larger than the read cache size, the method further comprising:
   determining, by the storage controller, if data corresponding to the read request is in the read cache.

3. The method for efficient use of a read cache by a storage controller of claim 2, wherein if the storage controller determines the data corresponding to the read request is in the read cache, the method further comprising:
   identifying, by the storage controller, the portion of the read cache comprising the data corresponding to the read request;
   removing, by the storage controller, the portion of the read cache comprising the data corresponding to the read request from the read cache; and
   processing, by the storage controller, the read request from the portion of the read cache comprising the data corresponding to the read request.

4. The method for efficient use of a read cache by a storage controller of claim 2, wherein if the storage controller determines the data corresponding to the read request is not in the read cache, the method further comprising:
   identifying, by the storage controller, the first area of the read cache, wherein the size of the first area corresponds to the size of the read request;
   removing, by the storage controller, the first area of the read cache from the read cache;
   processing, by the storage controller, the read request from one or more storage devices coupled to the storage controller; and
   storing, by the storage controller, read request data from the one or more storage devices in the first area of the read cache.

5. The method for efficient use of a read cache by a storage controller of claim 4, wherein processing the read request from the one or more storage devices coupled to the storage controller comprises:
reading, by the storage controller, data corresponding to the read request from the one or more storage devices.

6. The method for efficient use of a read cache by a storage controller of claim 1, wherein the read cache comprises a plurality of equal sized cache elements, wherein read data is stored in the cache elements, wherein the cache elements are organized into an ordered list, wherein a first end of the ordered list comprises data that has been in the read cache for the longest time, wherein a second end of the ordered list comprises data that has been in the read cache for the shortest time, wherein the first end of the ordered list is opposite to the second end of the ordered list.

7. The method for efficient use of a read cache by a storage controller of claim 6, wherein the storage controller maintains a pointer to the first end of the ordered list, wherein the storage controller updates the pointer to the first end of the ordered list whenever the storage controller performs any of migrating, removing, or storing data to or from the first area of the read cache.

8. The method for efficient use of a read cache by a storage controller of claim 6, wherein the storage controller maintains a pointer to the second end of the ordered list, wherein the storage controller updates the pointer to the second end of the ordered list whenever the storage controller performs any of migrating, removing, or storing data to or from the second area of the read cache.

9. The method for efficient use of a read cache by a storage controller of claim 1, wherein read requests in the host stream that the storage controller has not yet completed comprises read requests where read data corresponding to the read requests has not yet been provided to the host computer that generated the read requests.

10. A storage controller providing for efficient use of a read cache, comprising:
a processor;
a memory, coupled to the processor, the memory comprising:
the read cache; and
metadata, comprising:
a host stream size, wherein the host stream size is a current cumulative size of all read requests in a host stream, wherein the host stream is a consecutive group of sequential read requests from the host computer; and
the read cache size,
wherein after the storage controller receives a read request from a host computer coupled to the storage controller, the processor determines if the host stream size is larger than the read cache size, wherein if the host stream size is larger than the read cache size the processor migrates data corresponding to the read request to a first area of the read cache containing data that has been in the read cache for the longest time, wherein if the host stream size is not larger than the read cache size the processor migrates data corresponding to the read request to a second area of the read cache containing data that has been in the read cache for the shortest time.

11. The storage controller of claim 10, wherein before the processor determines if the host stream size is larger than the read cache size, the processor determines if data corresponding to the read request is in the read cache.

12. The storage controller of claim 11, wherein if the processor determines the data corresponding to the read request is in the read cache, the processor identifies the portion of the read cache comprising the data corresponding to the read request, removes the portion of the read cache comprising the data corresponding to the read request from the read cache and processes the read request from the portion of the read cache comprising the data corresponding to the read request.

13. The storage controller of claim 11, wherein if the processor determines the data corresponding to the read request is not in the read cache, the processor identifies the first area of the read cache, removes the first area of the read cache from the read cache, processes the read request from one or more storage devices coupled to the storage controller, and stores read request data from the one or more storage devices in the first area of the read cache, wherein the size of the first area corresponds to the size of the read request.

14. The storage controller of claim 13, wherein the processor processes the read request from the one or more storage devices coupled to the storage controller comprises the processor reads data corresponding to the read request from the one or more storage devices.

15. The storage controller of claim 10, wherein the read cache comprises a plurality of equal sized cache elements, wherein read data is stored in the cache elements, wherein the cache elements are organized into an ordered list, wherein a first end of the ordered list comprises data that has been in the read cache for the longest time, wherein a second end of the ordered list comprises data that has been in the read cache for the shortest time, wherein the first end of the ordered list is opposite to the second end of the ordered list.

16. The storage controller of claim 15, wherein the processor maintains a pointer to the first end of the ordered list, wherein the processor updates the pointer to the first end of the ordered list whenever the processor performs any of migrating, removing, or storing data to or from the first area of the read cache.

17. The storage controller of claim 15, wherein the processor maintains a pointer to the second end of the ordered list, wherein the processor updates the pointer to the second end of the ordered list whenever the processor performs any of migrating, removing, or storing data to or from the second area of the read cache.

18. The storage controller of claim 10, wherein read requests in the host stream that the processor has not yet completed comprises read requests where read data corresponding to the read requests has not yet been provided to the host computer that generated the read requests.

19. A storage system for providing for efficient use of a storage controller read cache, comprising:
a host computer for providing read requests;
a storage controller, coupled to the host computer, comprising:
a processor; and
a memory, coupled to the processor, the memory comprising:
the read cache, comprising:
an ordered list of equal sized cache elements, wherein the cache elements store read data, wherein a first end of the ordered list stores data that has been in the read cache for the longest time, wherein a second end of the ordered list stores data that has been in the read cache for the shortest time, wherein the first end of the ordered list is opposite to the second end of the ordered list; and
metadata, comprising:
a host stream size, wherein the host stream size is a current cumulative size of all read requests in a host stream, wherein the host stream is a consecutive group of sequential read requests from the host computer; and a read cache size, wherein the read cache size is the cumulative size of all cache elements;

one or more storage devices, coupled to the storage controller, wherein after the storage controller receives a read request from the host computer, the processor determines if the host stream size is larger than the read cache size, wherein if the host stream size is larger than the read cache size the processor migrates data corresponding to the read request to the first end of the ordered list, wherein if the host stream size is not larger than the read cache size the processor migrates data corresponding to the read request to the second end of the ordered list.

20. The storage system for providing for efficient use of a storage controller read cache of claim 19, wherein prior to before the processor determines if the host stream size is larger than the read cache size, the processor determines if data corresponding to the read request is in the read cache, wherein if the processor determines the data corresponding to the read request is in the read cache, the processor identifies the portion of the read cache comprising the data corresponding to the read request, removes the portion of the read cache comprising the data corresponding to the read request from the read cache and processes the read request from the portion of the read cache comprising the data corresponding to the read request, wherein if the processor determines the data corresponding to the read request is not in the read cache, the processor identifies a number of cache elements at the first end of the ordered list equal in size to the read request data, removes the number of cache elements at the first end of the ordered list equal in size to the read request data from the ordered list, processes the read request from the one or more storage devices coupled to the storage controller, and stores the read request data from the one or more storage devices in the number of cache elements at the first end of the ordered list equal in size to the read request data.

* * * * *